Figure 1:
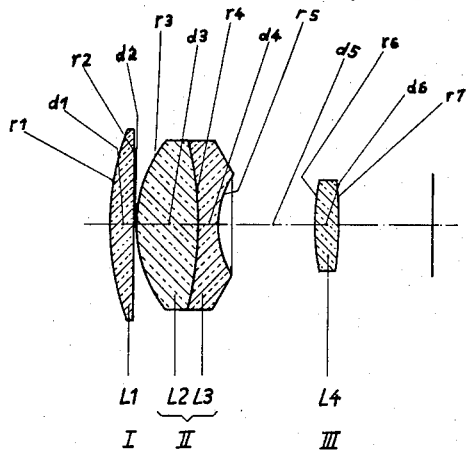

July 11, 1961   R. SOLISCH   2,991,696
HIGH-SPEED OPTICAL OBJECTIVE
Filed Dec. 21, 1959

Rudolf Solisch
INVENTOR.

BY
Agent

United States Patent Office 2,991,696
Patented July 11, 1961

2,991,696
HIGH-SPEED OPTICAL OBJECTIVE
Rudolf Solisch, Gottingen, Germany, assignor to Isco Optische Werke G.m.b.H., Gottingen-Wiende, Germany, a corporation of Germany
Filed Dec. 21, 1959, Ser. No. 860,862
Claims priority, application Germany Dec. 20, 1958
2 Claims. (Cl. 88—57)

My present invention relates to a high-speed photographic or cinematographic objective, particularly (but not exclusively) one designed for use in optical projectors.

It is an object of this invention to provide an objective of this character having a large aperture ratio, preferably of 1:1.4 or greater, which is satisfactorily corrected for spherical aberation, field curvature and other types of distortion. Such correction has heretofore necessitated the use of a relatively large number of components or individual lens elements. My invention, therefore, aims more specifically at achieving the foregoing object with a minimum of component parts.

Where an objective is to be used for projection purposes, the presence of a cemented member next to the plane of the film is disadvantageous because the intense heat of the projection lamp may affect the bond at the cemented surfaces. It is, therefore a still more particular object of this invention to realize the aforementioned advantages in an objective whose rearmost component is a simple lens.

I have found that, in accordance with the present invention, the foregoing objects can be achieved by an objective system consisting of four lenses assembled into three components, i.e. a front component in the form of a single positive lens on the side of the longer light rays (hereinafter termed the object side), an intermediate component consisting of two cemented or closely spaced lenses of opposite refractivity, and a rear component in the form of another single positive lens on the side of the shorter light rays (hereinafter termed the image side). More particularly, the intermediate component is in the shape of a dispersive meniscus composed of an object-side positive lens of biconvex configuration and an image-side negative lens of biconcave configuration, the outer surfaces of this meniscus being thus convex toward the object side. The axial thickness of the biconvex lens of the intermediate component, which will generally be more than twice the axial thickness of the associated biconcave lens, has been found to be critical, as has been the axial spacing of the second and third components; thus, the sum of this axial spacing and of the thickness of said biconvex lens should be neither less than about 0.5 nor more than about 0.7 times the overall focal length of the objective system.

According to another feature of my invention, which further contributes to a suppression of aberrations, the mean of the radii of curvature of the external surfaces of the meniscus-shaped intermediate component should range between approximately 0.3 and 0.5 times the overall focal length, hence the sum of these radii should have a maximum substantially equal to this focal length and a minimum substantially equal to three-fifths thereof.

Figure 2:
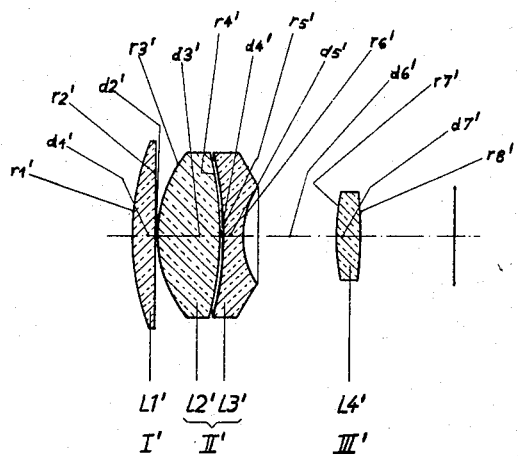

The invention will be described in greater detail with reference to the accompanying drawing in which FIGS. 1 and 2 schematically illustrate two representative embodiments.

The objective system of FIG. 1 consists of a front component I, an intermediate component II and a rear component III. Component I is a single positive lens $L_1$ having radii of curvature $r_1$, $r_2$ and thickness $d_1$; it is separated by a small air space $d_2$ from the biconvex forward element $L_2$ (radii $r_3$, $r_4$ and thickness $d_3$) of component II which is cemented onto the biconcave rear element $L_3$ thereof (radii $r_4$, $r_5$ and thickness $d_4$). A relatively large air space $d_5$ separates intermediate component II from rear component III which consists of a single positive lens $L_4$ having radii $r_6$, $r_7$ and thickness $d_6$.

Representative values of the parameters $r_1$ to $r_7$ and $d_1$ to $d_6$, based upon an overall focal length of value 1, as well as of the refractive indices $n_d$ and the Abbé numbers $v$ of lenses $L_1$ to $L_4$, are given hereinbelow for an objective system having a relative aperture of 1:1.4.

Table I

| Lens | | Radii | Thicknesses and Air Spacings | $n_d$ | $v$ |
|---|---|---|---|---|---|
| I | $L_1$ | $r_1=+1.04000$ | $d_1=0.10000$ | 1.74400 | 44.90 |
|   |       | $r_2=+11.02800$ | $d_2=0.00200$ | air space | |
| II | $L_2$ | $r_3=+0.52034$ | $d_3=0.24000$ | 1.63854 | 55.48 |
|    | $L_3$ | $r_4=-1.34239$ | $d_4=0.08000$ | 1.76182 | 26.52 |
|    |       | $r_5=+0.36840$ | $d_5=0.38000$ | air space | |
| III | $L_4$ | $r_6=+0.89876$ | $d_6=0.10000$ | 1.74400 | 44.90 |
|     |      | $r_7=-1.70742$ | | | |

It will be seen from the foregoing table that the system of FIG. 1 satisfies the requirements previously set forth in that the sum of lens thickness $d_3$ and of inter-component spacing $d_5$ equals 0.62 while the mean of radii $r_3$ and $r_5$ is approximately equal to 0.44.

The modified system of FIG. 2 is generaly similar to that of FIG. 1, the three components I', II', III' being constituted by four lenses $L_1'$ (radii $r_1'$, $r_2'$ and thickness $d_1'$), $L_2'$ (radii $r_3'$, $r_4'$ and thickness $d_3'$), $L_3'$ (radii $r_5'$, $r_6'$ and thickness $d_5'$) and $L_4'$ (radii $r_7'$, $r_8'$ and thickness $d_7'$). Biconvex lens $L_2'$ is separated from front lens $L_1'$ by a small air space $d_2'$ and from its biconcave companion lens $L_3'$ by a similar air space $d_4'$. A large air space between lenses $L_3'$ and $L_4'$ has been designated $d_6'$.

Representative values of the parameters of the system of FIG. 2 are given below for an objective system of relative aperture 1:1.3.

Table II

| Lens | | Radii | Thicknesses and Air Spacings | $n_d$ | $v$ |
|---|---|---|---|---|---|
| I' | $L_1'$ | $r_1'=+1.03060$ | $d_1'=0.12000$ | 1.78443 | 43.77 |
|    |        | $r_2'=+4.68920$ | $d_2'=0.00300$ | air space | |
| II' | $L_2'$ | $r_3'=+0.51855$ | $d_3'=0.35000$ | 1.53996 | 59.66 |
|     |        | $r_4'=-1.10030$ | $d_4'=0.00300$ | air space | |
|     | $L_3'$ | $r_5'=-1.10030$ | $d_5'=0.05000$ | 1.78470 | 26.10 |
|     |        | $r_6'=+0.38335$ | $d_6'=0.22500$ | air space | |
| III' | $L_4'$ | $r_7'=+0.90790$ | $d_7'=0.08000$ | 1.78443 | 43.77 |
|      |        | $r_8'=-1.35005$ | | | |

Here again, as in the preceding embodiment, the sum of lens thickness $d_3'$ and spacing $d_6'$ falls within the afore-stated limits by equaling 0.575, the mean of the radii $r_3'$ and $r_6'$ also satisfying the requirement for optimal performance by amounting to approximately 0.45.

I claim:
1. An optical objective system consisting of a front component, an intermediate component and a rear component air-spaced from one another, said front component being a single positive first lens, said intermediate component being in the shape of a dispersive menis- cus composed of a biconvex second lens adjacent said front component and a biconcave third lens facing said rear component, said second and third lenses being cemented together, said rear component being a single positive fourth lens, the magnitudes of the radii of curvature $r_1$ to $r_7$ and the thicknesses and spacings $d_1$ to $d_6$ of said first lens $L_1$, said second lens $L_2$, said third lens $L_3$ and said fourth lens $L_4$, based upon a numerical value of unity for said overall focal length, as well as the refractive indices $n_d$ and the Abbé numbers $v$ thereof being substantialy as given in the following table:

| Lens | Radii | Thicknesses and Air Spacings | $n_d$ | $v$ |
|---|---|---|---|---|
| $L_1$ | $r_1=+1.04000$ | $d_1=0.10000$ | 1.74400 | 44.90 |
|  | $r_2=+11.02800$ | $d_2=0.00200$ | air space |  |
| $L_2$ | $r_3=+0.52034$ | $d_3=0.24000$ | 1.63854 | 55.48 |
| $L_3$ | $r_4=-1.34239$ | $d_4=0.08000$ | 1.76182 | 26.52 |
|  | $r_5=+0.36840$ | $d_5=0.38000$ | air space |  |
| $L_4$ | $r_6=+0.89876$ | $d_6=0.10000$ | 1.74400 | 44.90 |
|  | $r_7=-1.70742$ |  |  |  |

2. An optical objective system consisting of a front component, an intermediate component and a rear component air-spaced from one another, said front component being a single positive first lens, said intermediate component being in the shape of a dispersive meniscus composed of a biconvex second lens adjacent said front component and a biconcave third lens facing said rear component, said second and third lenses being separated by a small air space, said rear component being a single positive fourth lens, the magnitudes of the radii of curvature $r_1'$ to $r_8'$ and the thicknesses and spacings $d_1'$ to $d_7'$ of said first lens $L_1'$, said second lens $L_2'$, said third lens $L_3'$ and said fourth lens $L_4'$, based upon a numerical value of unity for said overall focal length, as well as the refractive indices $n_d$ and the Abbé numbers $v$ thereof being substantially as given in the following table:

| Lens | Radii | Thicknesses and Air Spacings | $n_d$ | $v$ |
|---|---|---|---|---|
| $L_1'$ | $r_1'=+1.03060$ | $d_1'=0.12000$ | 1.78443 | 43.77 |
|  | $r_2'=+4.68920$ | $d_2'=0.00300$ | air space |  |
| $L_2'$ | $r_3'=+0.51855$ | $d_3'=0.35000$ | 1.53996 | 59.66 |
|  | $r_4'=-1.10030$ | $d_4'=0.00300$ | air space |  |
| $L_3'$ | $r_5'=-1.10030$ | $d_5'=0.05000$ | 1.78470 | 26.10 |
|  | $r_6'=+0.38335$ | $d_6'=0.22500$ | air space |  |
| $L_4'$ | $r_7'=+0.90790$ | $d_7'=0.08000$ | 1.78443 | 43.77 |
|  | $r_8'=-1.35005$ |  |  |  |

References Cited in the file of this patent

UNITED STATES PATENTS

| | | |
|---|---|---|
| 2,622,479 | Bertele | Dec. 23, 1952 |
| 2,721,501 | Bertele | Oct. 25, 1955 |
| 2,907,248 | Lautenbacher | Oct. 6, 1959 |

FOREIGN PATENTS

| | | |
|---|---|---|
| 350,323 | Great Britain | June 11, 1931 |